US012705988B2

(12) United States Patent
Blanc et al.

(10) Patent No.: US 12,705,988 B2
(45) Date of Patent: Aug. 11, 2026

(54) SYSTEM FOR CERTIFYING A PLANNED TRAJECTORY OF AN AIRCRAFT AND ASSOCIATED CERTIFICATION METHOD

(71) Applicant: THALES, Courbevoie (FR)

(72) Inventors: Gilles Blanc, Toulouse (FR); Ronan Demonent, Toulouse (FR)

(73) Assignee: THALES, Courbevoie (FR)

( * ) Notice: Subject to any disclaimer, the term of this patent is extended or adjusted under 35 U.S.C. 154(b) by 602 days.

(21) Appl. No.: 17/926,081

(22) PCT Filed: May 20, 2021

(86) PCT No.: PCT/EP2021/063517
§ 371 (c)(1),
(2) Date: Nov. 17, 2022

(87) PCT Pub. No.: WO2021/234109
PCT Pub. Date: Nov. 25, 2021

(65) Prior Publication Data

US 2023/0196923 A1 Jun. 22, 2023

(30) Foreign Application Priority Data

May 20, 2020 (FR) ..................................... 20 05242

(51) Int. Cl.
*G08G 5/34* (2025.01)
*G08G 5/22* (2025.01)
(Continued)

(52) U.S. Cl.
CPC ................ *G08G 5/34* (2025.01); *G08G 5/22* (2025.01); *G08G 5/26* (2025.01); *G08G 5/32* (2025.01);
(Continued)

(58) Field of Classification Search
None
See application file for complete search history.

(56) References Cited

U.S. PATENT DOCUMENTS

2011/0172914 A1 7/2011 Coulmeau et al.
2017/0148331 A1 5/2017 Raynaud et al.
2017/0221367 A1* 8/2017 Kawalkar ................ G08G 5/32

FOREIGN PATENT DOCUMENTS

FR 2 955 192 7/2011
FR 3 070 787 3/2019
(Continued)

OTHER PUBLICATIONS

Translation of FR-3070787 (Year: 2019).*
(Continued)

*Primary Examiner* — Peter D Nolan
*Assistant Examiner* — Michael F Whalen
(74) *Attorney, Agent, or Firm* — NIXON & VANDERHYE

(57) ABSTRACT

Disclosed is a system for certifying a planned trajectory of an aircraft, the certification system being remote from the aircraft and including: a receiving device configured to receive the planned trajectory; a processing device including a plurality of processing modules, each processing module being configured to certify a given trajectory according to at least one certification rule specific to the processing module; a selection device configured to select one or more processing modules, which are referred to as active modules, to be used to certify the planned trajectory; a sending device configured to send a signal including a piece of certification information relating to the certification of the planned trajectory by all of the active modules.

17 Claims, 2 Drawing Sheets

(51) Int. Cl.

| | |
|---|---|
| ***G08G 5/26*** | (2025.01) |
| ***G08G 5/32*** | (2025.01) |
| ***G08G 5/55*** | (2025.01) |
| ***G08G 5/57*** | (2025.01) |
| ***G08G 5/59*** | (2025.01) |
| ***G08G 5/74*** | (2025.01) |
| ***G08G 5/76*** | (2025.01) |
| ***G08G 5/80*** | (2025.01) |

(52) U.S. Cl.
CPC ................. *G08G 5/55* (2025.01); *G08G 5/57* (2025.01); *G08G 5/59* (2025.01); *G08G 5/74* (2025.01); *G08G 5/76* (2025.01); *G08G 5/80* (2025.01)

(56) References Cited

FOREIGN PATENT DOCUMENTS

| | | | | |
|---|---|---|---|---|
| FR | 3070787 | A1 * | 3/2019 | ........... G08G 5/0013 |
| WO | WO-2021194569 | A2 * | 9/2021 | ........... G01C 1/3469 |

OTHER PUBLICATIONS

International Search Report dated Jun. 30, 2021, for PCT/EP2021/063517, 7 pp.
Written Opinion of the ISA dated Jun. 30, 2021, for PCT/EP2021/063517, 10 pp.
French Search Report dated Feb. 2, 2021, for FR 2005242, 2 pp.

* cited by examiner

SYSTEM FOR CERTIFYING A PLANNED TRAJECTORY OF AN AIRCRAFT AND ASSOCIATED CERTIFICATION METHOD

CROSS-REFERENCE TO RELATED APPLICATIONS

This application is the US national stage of PCT/EP2021/063517 filed May 20, 2021, which designated the US and claims priority to French Application No. 20 05242, filed on May 20, 2020, both of which are incorporated herein by reference in their entirety.

FIELD

The present invention relates to a system for certifying a planned trajectory of an aircraft.

The present invention also relates to a method of certifying a planned trajectory of an associated aircraft.

The invention relates to the field of autonomous aircraft. Such aircraft are, for example, configured to follow a trajectory without human intervention.

BACKGROUND

Devices for verifying that a trajectory of an aircraft conforms to reference data comprising a reference map are known, for example from the Applicant's document FR 2955192 A1. For example, when a non-conformity of the trajectory with respect to these reference data is detected, an alarm is issued.

However, such devices may yet be improved.

The verification of the trajectory is not always in accordance with the requirements for certification of a trajectory within an airspace.

For example, verification criteria are fixed and cannot easily be adapted, in particular according to the need of an aircraft operator or to changes in certification requirements within an airspace.

Thus, it is difficult, for example, for operators of small aircraft to obtain a verification of a trajectory by a known method of this kind, especially given the high costs for verification.

SUMMARY

One aim of the present invention is thus to obtain a certification system that allows flexible certification of a planned trajectory of an aircraft.

To this end, the subject matter of the invention is a system for certifying a planned trajectory of an aircraft, the certification system being remote from the aircraft and comprising:

- a receiving device configured to receive the planned trajectory;
- a processing device comprising a plurality of processing modules, each processing module being configured to certify a given trajectory according to at least one certification rule specific to said processing module;
- a selection device configured to select one or more processing modules, called active modules, to be used to certify the planned trajectory;
- a sending device configured to send a signal comprising a piece of certification information relating to the certification of the planned trajectory by all of the active modules.

The certification system thus allows only certain modules of the plurality of modules to be used to certify the planned trajectory. A choice of active modules is made via the selection device, for example, according to an operator's need. In this way, the certification system allows for flexible certification of a planned aircraft trajectory.

According to other advantageous aspects of the invention, the certification system comprises one or more of the following features, taken alone or in any technically possible combination:

- The selection of the active module(s) depends on the equipment on board the aircraft, on a regulation by an airspace authority, and/or on a mission of the aircraft.
- the selection device is configured to select one or more active modules based on a user's choices made from a remote terminal.
- each processing module is configured to use external data relating to an external environment of the aircraft from a certified database.
- the certification system further comprises a processing modification device, configured to add or remove at least one processing module independently of an operation of the other processing modules.
- the specific certification rules are independent of each other.
- the planned trajectory comprises a take-off point, a landing point, and a flight portion of the planned trajectory connecting the take-off point and the landing point.
- each processing module is configured to certify the planned trajectory based on at least one piece of data relating to a list consisting of: terrain; obstacles; areas of turbulence; areas of time-restricted access; reception coverage for satellite navigation system signals; mobile phone or satellite phone communications coverage; and trajectories of other aircraft.
- each specific certification rule comprises determining the absence of conflicts between data for the planned trajectory and at least one condition selected from the list consisting of: the planned trajectory has a minimum margin to obstacles, the minimum margin at least depending on the wind around the planned trajectory at the time of flight of the planned trajectory; the planned trajectory is confined within a cage, with no position within the cage overlapping with an obstacle or a prohibited area; the planned trajectory is continuous, the continuity of the planned trajectory depending on a calculation of the energy required to fly the planned trajectory completely; the planned trajectory has a minimum distance to the terrain; the planned trajectory has a minimum distance to obstacles and/or time-restricted areas; the planned trajectory lies within a defined corridor around a predefined flight trajectory; the planned trajectory has an altitude above a minimum threshold relative to the terrain; the planned trajectory has a minimum reception coverage for satellite navigation system signals; the planned trajectory has a minimum mobile phone or satellite phone communications coverage; and the planned trajectory has a minimum distance to other trajectories.
- the certification information comprises a piece of safety data determined by a cyclic redundancy check of the certified trajectory.

The invention also relates to a method of certifying a planned trajectory of an aircraft, implemented by a certification system that is remote from the aircraft, the certification system comprising a receiving device configured to receive the planned trajectory, a processing device comprising a plurality of processing modules, each processing module being configured to certify a given trajectory according to at least one certification rule specific to said processing module, a selection device configured to select one or more processing modules, called active modules, to be used to certify the planned trajectory, and a sending device configured to send a signal comprising a piece of certification information relating to the planned trajectory, the certification method comprising a step of:

receiving the planned trajectory;

selecting one or more active modules used to certify the planned trajectory; and sending a signal comprising a piece of certification information relating to the certification of the planned trajectory by all of the active modules.

According to one advantageous aspect of the invention, the certification method comprises the following feature: the certification information comprises a piece of safety data determined by a cyclic redundancy check of the certified trajectory.

BRIEF DESCRIPTION OF THE DRAWINGS

These features and advantages of the invention will become apparent from the following description, which is given solely by way of non-limiting example, with reference to the attached drawings, in which.

DETAILED DESCRIPTION

Figure 1:
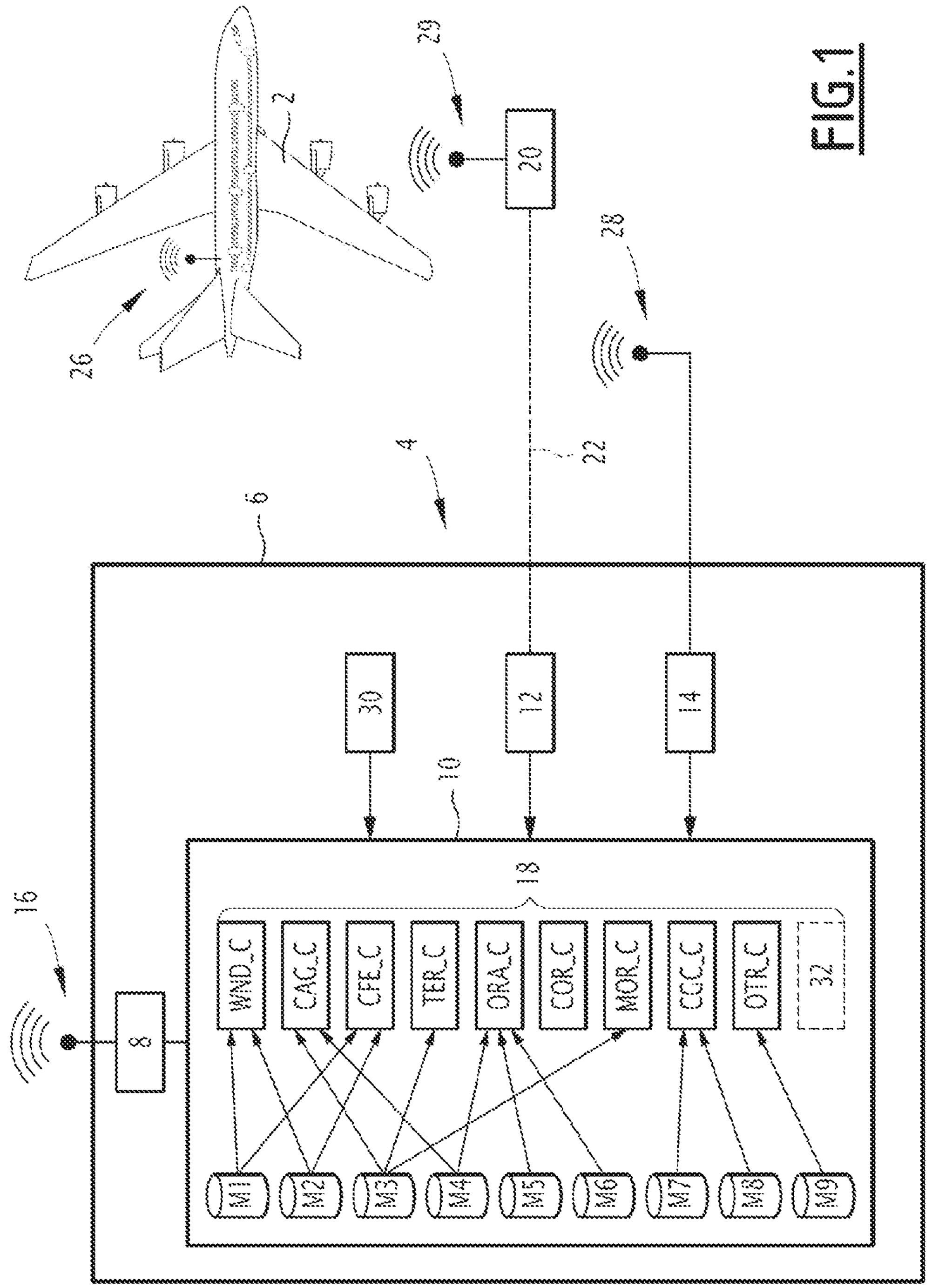
FIG. 1 is a schematic view of an aircraft and a certification facility comprising a certification system according to the invention.

FIG. 1 shows an aircraft 2 and a certification facility 4 for certifying a planned trajectory of the aircraft 2.

The aircraft 2 is, for example, an autonomous aircraft, configured to follow a trajectory without human intervention.

The aircraft 2 is, for example, unmanned, i.e. no passenger or pilot is likely to be on board. This is particularly the case for a drone. According to another example, the aircraft 2 is manned, but by passengers who have no pilot qualifications.

According to one embodiment, the aircraft 2 is configured to be flown or supervised by a remote pilot.

For example, the aircraft 2 comprises a short-term collision avoidance system, for example, a Terrain Awareness and Warning System (TAWS). In another example, the short-term collision avoidance system is a Detect and Avoid (DAA) system. The short-term collision avoidance system is configured to extrapolate a short-term trajectory along the axis of the aircraft 2 and to warn a control system of the aircraft 2 in case of a risk of impact.

The aircraft 2 comprises, for example, a determination system (not shown) configured to determine the planned trajectory. Alternatively, the planned trajectory determination system is located outside the aircraft 2, for example, arranged in a fixed manner on the ground, in particular remote from the certification facility 4.

The planned trajectory is, for example, a trajectory determined before the flight of the aircraft 2, in particular when the aircraft 2 is on the ground.

The planned trajectory comprises, in particular, a take-off point, a landing point, and a flight portion of the planned trajectory connecting the take-off point and the landing point. Thus, the planned trajectory is, in particular, a so-called "complete" trajectory, for example, a planned trajectory of a mission of the aircraft 2.

A person skilled in the art will then understand that the planned trajectory differs from a so-called short-term trajectory, which corresponds to a trajectory comprising data on an interval in the range of a few seconds to a few minutes only.

The planned trajectory comprises a plurality of parameters. For example, the trajectory comprises five parameters, namely three parameters relating to geographical coordinates, one parameter relating to time information, and one parameter relating to a speed, in particular a speed for each defined point of the planned trajectory.

The planned trajectory is, for example, formed by a plurality of data blocks. Each data block comprises, for example, one or more values of each parameter of the planned trajectory.

The certification facility 4 comprises a system 6 for certifying the planned trajectory of the aircraft 2, a remote terminal 20, a receiving antenna 16, and a transmitting antenna 28.

The certification system 6 is remote from the aircraft 2. For example, the certification system 6 is located on the ground. For example, the certification system 6 is integrated into a ground control centre.

According to one example, the certification system 6 is implemented on a server, on a set of servers, or in a cloud.

The certification system 4 is configured to certify the planned trajectory. This is understood to mean that the certification system 4 is configured to verify the planned trajectory, and that the certification system 6 is a certified system, in particular according to a predefined standard.

For example, the certification system 6 is certified according to a standard such as DO-178C, namely DO-178C/ED-12C, entitled "Software Considerations in Airborne Systems and Equipment Certification", and accepted by the Radio Technical Commission for Aeronautics in December 2011.

The certification system 6 is, for example, hosted on hardware that is also certified, for example, according to a standard such as DO-254.

The certification system 6 comprises a receiving device 8, a processing device 10, a selection device 12, and a sending device 14.

The receiving device 8, the processing device 10, the selection device 12, and the sending device 14 are each integrated into at least one computer.

In this case, each of these devices is at least partially in the form of software that can be executed by a processor and stored in a memory of the computer.

Alternatively or additionally, each of these devices is integrated, at least partially, into a physical device, such as a programmable logic circuit, such as an FPGA (Field Programmable Gate Array), or in the form of a dedicated integrated circuit, such as an ASIC (Application Specific Integrated Circuit).

The receiving device 8 is configured to receive the planned trajectory, in particular via the receiving antenna 16 connected to the receiving device 8. Alternatively, the receiving device 8 is configured to receive the planned trajectory via a cable connection.

The processing device 10 is configured to certify the planned trajectory according to at least one certification rule, to obtain a certified trajectory. This is understood to mean that the processing device 10 is a device certified for verifying the planned trajectory.

The certified trajectory corresponds with, for example, the planned trajectory certified by the certification system 6. In particular, the certified trajectory is the planned trajectory that is verified according to criteria predefined by the certification system 6.

The certified trajectory comprises, for example, like the planned trajectory, a plurality of parameters. For example, the certified trajectory comprises five parameters, namely three parameters relating to geographical coordinates, one parameter relating to time information, and one parameter relating to speed information.

The certified trajectory is, for example, formed by a plurality of data blocks. Each data block comprises, for example, one or more values of each parameter of the certified trajectory.

For example, the certified trajectory guarantees a DAL B criticality level according to the DO-178C standard. According to another example, the certified trajectory guarantees a DAL A criticality level.

In addition, the processing device 10 is, for example, configured to determine certification information relating to the certification of the planned trajectory.

The certification information comprises, for example, certification data indicating that the planned trajectory is a trajectory certified by the certification system 6.

For example, the certification information further comprises safety data determined by a cyclic redundancy check (CRC) of the certified trajectory.

The safety data can be used, for example, to verify the error-free transmission of the certified trajectory.

The processing device 10 comprises a plurality of processing modules 18. Each processing module 18 is configured to certify a given trajectory according to at least one certification rule specific to said processing module 18. Each specific certification rule is, in particular, a predetermined rule.

The selection device 12 is configured to select one or more processing modules 18, called active modules, to be used to certify the planned trajectory. In particular, upon selection, only the active modules are used to certify the planned trajectory according to the specific certification rule thereof, to obtain the certified trajectory.

According to one example, the certification information further comprises, for example, a piece of certification data indicating the active module(s) used to certify the planned trajectory.

The selection of the active module(s) depends, for example, on the equipment on board the aircraft 2, on a regulation by an airspace authority, and/or on a mission of the aircraft 2.

By way of example, where the aircraft 2 comprises redundant position sensors, poor signal reception coverage from a satellite navigation system, such as GPS (Global Positioning System), is replaceable by other position sensors in the aircraft 2. In this example, the selection is likely not to comprise as an active module a processing module 18 configured to certify a minimum coverage of GPS signal reception. A module of this kind is, for example, referred to as the CGC_C module below.

The remote terminal 20 is configured to receive choices from a user. For this purpose, the terminal 20 has, for example, an adapted human-machine interface that allows the user to make these choices. According to one example of an embodiment, this interface allows the various processing modules 18 to be represented in a graphical and/or textual form so that the user can select the necessary modules.

In particular, the remote terminal 20 is remote from the certification system 6 and is connected via a wired and/or wireless data link 22 to the certification system 6, in particular to the selection device 12.

In particular, the selection device 12 is configured to select one or more active modules based on user choices made from the remote terminal 20.

The processing device 10 is, for example, configured to output the certification information.

In addition, the processing device 10 is configured to provide the certified trajectory, which is identical to the planned trajectory.

The sending device 14 is configured to send one or more signals to the aircraft 2.

According to a first example, the sending device 14 is configured to send the signal(s) directly to the aircraft 2, in particular by sending the antenna 28 to an antenna 26 of the aircraft 2.

According to a second example, the sending device 14 is configured to send the signal(s) to the aircraft 2 via the remote terminal 20. In this case, the remote terminal 20 comprises a receiving and sending antenna 29. The remote terminal 20 is thus configured to receive, via the antenna 29, the signal(s) from the sending device 14. The remote terminal 20 is, for example, configured to send, after an optional receipt of a confirmation by the user, the signal(s) to the aircraft 2, via the antenna 29 or another transmission means.

The sending device 14 is, for example, configured to send to the aircraft 2 a first signal comprising the certification information relating to the certification of the trajectory planned by all of the active modules.

The sending device 14 is, for example, further configured to send to the aircraft 2 a second signal comprising the certified trajectory.

Alternatively, the sending device 14 is configured to send a signal comprising both the certification information and the certified trajectory.

According to one example, each data input and output of the certification system 6 comprises a dedicated firewall (not shown). This protects the certification system 6 and thus ensures the consistency of the calculations of the certification system 6.

An example of the processing device 10 is now described with reference to FIG. 1.

The processing device 10 comprises, for example, nine processing modules 18. The processing modules 18 are, for example, referred to as module WND_C, module CAG_C, module CFE_C, module TER_C, module ORA_C, module COR_C, module MOR_C, module CGC_C, and module OTR_C.

Each processing module 18 is configured to certify a given trajectory according to at least one certification rule specific to said processing module 18. In particular, each certification rule allows the planned trajectory to be verified according to one or more predefined criteria. In particular, each certification rule is implemented according to requirements of a standard, such as the standard DO-178C.

Preferably, the specific certification rules are independent of each other. For example, a change to a specific certification rule of one processing module 18 has no impact on a specific certification rule of another processing module 18.

For example, each specific certification rule comprises determining the absence of conflicts between data for the planned trajectory and at least one condition that is specific to the processing module 18.

The specific condition of the WND_C module is, for example, the condition that the planned trajectory has a minimum margin to obstacles. The margin depends on the wind around the planned trajectory at the time of flight of the planned trajectory, for example, the wind in a volume with a radius of 1 km around each point of the planned trajectory.

According to one example, the margin is further dependent on the accuracy of the guidance systems of the aircraft 2 and on the navigation and positioning systems of the aircraft 2.

The WND_C module is thus configured to determine the minimum margin due to wind and to verify whether the planned trajectory has a distance greater than or equal to the minimum margin from obstacles. The WND_C module is, for example, configured to receive, as input, meteorological data comprising wind forecasts at positions of the planned trajectory at corresponding times.

According to a preferred embodiment, the WND_C module is configured to receive, as input, a condition of a maximum wind, the condition being used to predetermine a margin of the planned trajectory. The WND_C module is thus configured to compare said maximum wind condition with a maximum wind present at each point of the planned trajectory. When said maximum wind is less than or equal to said maximum wind condition, the WND_C module thus validates that the planned trajectory complies with the certification rule of the WND_C module, namely that the determined margin of the trajectory is not exceeded.

The specific condition of the CAG_C module is the condition that the planned trajectory is confined within a cage, with no position within the cage overlapping with an obstacle or a prohibited area.

The prohibited area is, for example, a volume within an airspace that is subject to access restrictions. The cage has, for example, a parallelepipedal volume, the centre point of which is the position of the trajectory at a given moment.

The specific condition of the CFE_C module is the condition that the planned trajectory is continuous. The continuity of the planned trajectory depends on a calculation of the energy required to fly the planned trajectory completely. In particular, a planned trajectory is continuous when the aircraft 2 has the ability to fly said trajectory completely.

The CFE_C module is thus configured to determine the energy required to fly the planned trajectory completely, for example, by taking into account the flight schedule of the planned trajectory and the wind at the time of flight at positions of the planned trajectory.

To verify the specific condition, the CFE_C module is, for example, configured to take into account the performance of the aircraft 2. The CFE_C module is, for example, configured to determine the available energy for the aircraft 2, for example, from the amount of fuel on board, ampere hours, or kilograms of hydrogen, and compare the available energy with the required energy. When the available energy is greater than or equal to the required energy, the CFE_C module then certifies the planned trajectory according to this specific certification rule.

The specific condition of the TER_C module is the condition that the planned trajectory has a minimum distance to the terrain. For example, the TER_C module is configured to take, as input, terrain information from a terrain database. Each piece of terrain information is, for example, a terrain point, including the altitude thereof.

The specific condition of the MOR_C module is the condition that the planned trajectory has an altitude above a minimum threshold with respect to the terrain. For example, the MOR_C module is configured to compare only a vertical distance with the minimum threshold. In contrast to the MOR_C module, the TER_C module is configured to compare distances of the planned trajectory to the terrain, in any direction, with a minimum distance.

Alternatively, the modules MOR_C and TER_C form a single module, configured to verify that the trajectory, with the inaccuracies thereof, does not intercept the terrain, and/or that said trajectory is at a minimum altitude with respect to the terrain.

The specific condition of the ORA_C module is the condition that the planned trajectory has a minimum distance to obstacles and/or time-restricted areas.

The ORA_C module is, for example, configured to take into account the flight schedule of the planned trajectory, in order to take into account a piece of information relating to the presence of an obstacle at a given time interval or a restriction of access to an area at a given time interval.

The specific condition of the COR_C module is the condition that the planned trajectory is within a defined corridor around a predefined flight plan. For example, the COR_C module is configured to pre-verify whether the planned trajectory satisfies conditions according to a Required Navigation Performance (RNP) procedure.

A specific condition of the CGC_C module is, for example, the condition that the planned trajectory has a minimum coverage for receiving signals from a satellite navigation system, such as GPS (Global Positioning System), in particular for each position of the planned trajectory at the times corresponding to said positions.

Another specific condition of the CGC_C module is, for example, the condition that the planned trajectory has a minimum mobile phone or satellite phone communications coverage, such as communication according to 3G, 4G, 5G, or SatCom standards, in particular for each position of the planned trajectory at the times corresponding to these positions.

The specific condition of the OTR_C module is the condition that the planned trajectory has a minimum distance to other trajectories. For example, the OTR_C module is configured to receive trajectory data from other aircraft, e.g. from an Unmanned Aircraft System Traffic Management (UTM) system (not shown).

The processing modules are thus configured to apply one or more of the specific rules to certify the planned trajectory.

For example, only some of the processing modules are configured to take time into account. According to one example, only the WND_C, CFE_C, ORA_C, and CGC_C modules are configured to take time into account.

According to one example, the certification system 6 further comprises a processing modification device 30, configured to add or remove at least one processing module independently of the operation of the other processing modules 18. This is illustrated in FIG. 1, which shows an example of adding a module 32 as a new processing module 18.

Each processing module 18 is, for example, configured to use external data relating to an external environment of the aircraft 2 from a certified database. "External environment" is understood to mean a predefined volume around the aircraft 2 at each point of the planned trajectory, for example, a spherical volume having a predefined radius, such as a radius of 10 km.

For example, each processing module 18 is configured to certify the planned trajectory based on at least one of terrain, obstacles, areas of turbulence, time-restricted areas, reception coverage for satellite navigation system signals, mobile phone or satellite phone communications coverage, and/or trajectories of other aircraft.

For example, the processing device 10 comprises a plurality of databases, such as nine databases M1 to M9, in particular visible in the example of FIG. 1.

For example, each database is certified to a standard such as RTCA DO-200A/ED-76. For example, each database complies with a standard such as DPAL 1 or DPAL 2 (Data Process Assurance Level).

Each processing module 18 is configured to access one or more of the databases M1 to M9, as represented by arrows connecting the databases M1 to M9 with the respective processing modules 18.

According to one example, the database M1 comprises wind data for the modules WND_C and CFE_C. The database M2 comprises performance data for the aircraft 2 for the modules WND_C and CFE_C. The database M3 comprises terrain data for modules CAG_C, TER_C, and MOR_C. The database M4 comprises data relating to restricted areas for modules CAG_C and ORA_C. The database M5 comprises data relating to obstacles for module ORA_C. The database M6 comprises data on mobile volumes, e.g. time-restricted areas for module ORA_C. The database M7 comprises signal coverage data for a satellite navigation system, and the database M8 comprises coverage data for mobile phone or satellite phone communications for module GSC_C. The database M9 comprises trajectory data of other aircraft for module OTR_C. For example, the database M9 is configured to be populated by the UTM system.

Figure 2:
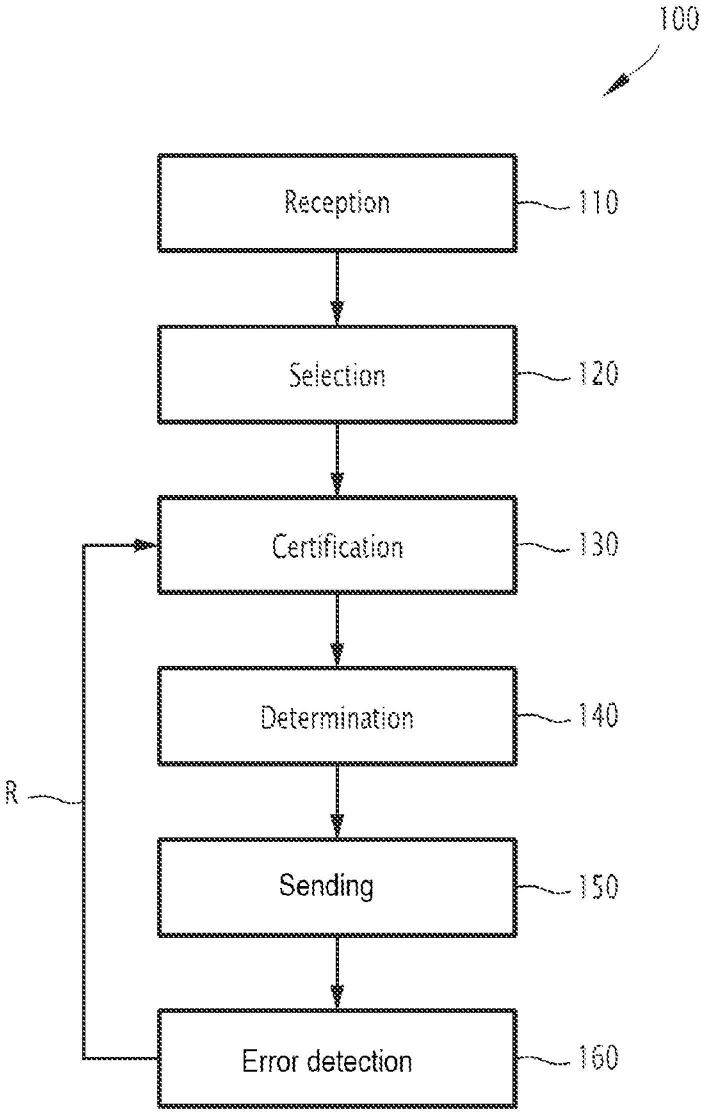
FIG. 2 is a flow chart of a certification method implemented by the certification system of FIG. 1.

A method 100 for certifying the planned trajectory of the aircraft 2 is now described, with reference to FIG. 2 showing a flow chart of an example of the certification method 100. The certification method 100 is, for example, implemented by the certification system 6.

The certification method 100 is, in particular, a method for verifying the trajectory planned by the certification system 6.

The certification method 100 comprises, for example, a receipt step 110, a selection step 120, a certification step 130, a determination step 140, a sending step 150, and an error detection step 160.

In the receipt step 110, the receiving device 8 receives the planned trajectory, for example, via the receiving antenna 16.

In the selection step 120, the selection device 12 selects one or more processing modules 18, called active modules, to be used to certify the planned trajectory, from the plurality of processing modules 18. This step is implemented following the choices made by the user from the remote terminal 20.

In the certification step 130, the processing device 10 certifies the planned trajectory according to at least one certification rule, to obtain the certified trajectory.

In particular, each active module certifies the planned trajectory according to the specific certification rule corresponding thereto.

In the determination step 140, the processing device 10 determines certification information relating to the certification of the planned trajectory.

For example, the determination step 140 is implemented after obtaining the certified trajectory in the certification step.

For example, the processing device 10 determines, for each data block of the certified trajectory, a test value based on said data block.

For example, the test value is a sum of the values of the corresponding block. For example, a block of the certified trajectory comprises a plurality of data points, each data point having five values for corresponding parameters, such as latitude, longitude, altitude, time, and an aircraft speed. The test value for a block of data comprises, for example, the sum of the values of each parameter, for each of the data points.

Alternatively, the test value comprises only some of the data points.

The processing device 10 then determines the safety data based on the test values. For example, the safety data are the sum of the test values. The safety data are thus determined by the CRC technique.

The test values are, for example, deterministic values. "Deterministic values" are understood to mean, in particular, that these values are determined according to a predefined method.

In the transmission step 150, the sending device 14 transmits to the aircraft 2 a first signal comprising the certification information, and a second signal comprising the certified trajectory.

According to a first example, the sending device 14 sends the first signal and the second signal directly to the aircraft 2, in particular by sending from the antenna 28 to the antenna 26 of the aircraft 2.

According to a second example, the sending device 14 sends the signal(s) to the aircraft 2 via the remote terminal 20. In such cases, the remote terminal 20 receives the first signal and the second signal via the antenna 29, for example, via a dedicated link (not shown) between the sending device 14 and the remote terminal 20. For example, the user verifies the certified trajectory received. Following a command from the user, the remote terminal 20, or other dedicated transmission means, transmits the first signal and the second signal to the aircraft 2.

For example, the first signal or the second signal is transmitted over at least one encrypted link. According to one particular example, the first signal and also the second signal are transmitted over the encrypted link.

The encrypted link has, for example, asymmetric encryption.

In particular, a private key is stored in the certification system 6 to encrypt the first signal and/or the second signal. The first and/or second signal can be decrypted by a public key stored on board the aircraft 2.

The fact that the private key is stored in the certification system 6 makes it easier to update said key, as it is more easily and securely modified than the key stored on board the aircraft 2.

According to one example, in the sending step 150, the sending device 14 transmits a certificate enabling the receiver, for example the remote terminal 20 or the aircraft 2, to verify that the first or second signal actually originates from the sending device 14.

When the first and second signals are transmitted via the remote terminal 20 to the aircraft 2, the remote terminal 20 verifies, by means of a dedicated certificate, that it is receiving the first and second signals from the receiving device 14, and the aircraft 2 verifies, by means of another dedicated certificate, that it is receiving the first and second signals from the remote terminal 2.

The integrity of the certified trajectory comprised in the second signal can be verified, in particular by the aircraft 2, using the safety data comprised in the certification information of the first signal, by a corresponding determination using the CRC technique.

For example, the aircraft 2 determines the safety data in the same manner as in the determination step 140, from the certified trajectory received in the second signal.

The aircraft 2 then compares the safety data determined in this way with the safety data received in the second signal. If the safety data are identical, then the aircraft 2 identifies that the certified trajectory has been transmitted without errors.

If the aircraft 2 determines that the certified trajectory comprised in the second signal differs from the certified trajectory in accordance with the certification information, the error detection step 160 is implemented.

In the error detection step 160, the certification system 6 receives a third signal comprising an error message. The third signal is thus sent by the aircraft 2 when the certified trajectory comprised in the second signal differs from the certified trajectory in accordance with the certification information.

Upon receipt of the third signal, the certification system 6 implements the steps of certification 130, determination 140, and sending 150 again following the error detection step 160. This is illustrated, in particular, in the example of FIG. 2 by an arrow R.

According to one example, the selection step 120 and the error detection step 160 are optional steps.

It can be seen that the certification system 6 and the certification method 100 have a number of advantages.

As the number and type of processing modules 18 used for certifying the planned trajectory can be selected, the certification system 6 allows the certification of the planned trajectory to be easily adapted according to the needs of the operator of the aircraft 2 or according to restrictions in certain airspaces, for example. This allows for a flexible certification of the planned trajectory as required. In particular, a selection of the processing modules 18 as active modules in the selection step 120 allows the operation of the certification system 6 to be easily adapted as required.

The certification method 100 also allows for a more flexible certification of the planned trajectory, as the certification system 6 remote from the aircraft 2 can be easily adapted by modifying the processing modules 18, in particular independently of each other.

In addition, for example, processing modules 18 that are not needed for the certification of a specific planned trajectory are not used as active modules. Thus, the certification system 6 allows for simple and fast certification.

Furthermore, the cyclic redundancy check of the certified trajectory ensures that the certified trajectory received by the aircraft 2 is indeed the certified trajectory as certified by the certification system 6.

In addition, the verification of the planned trajectory by the certification system 6, which can be accessed remotely by any user, allows each user, for example, the operator of the aircraft 2, to obtain a verification of the planned trajectory by a certified system at a low cost, as the costs of developing and operating the certification system 6 are shared by a large number of users.

The invention claimed is:

1. A certification system for certifying a planned trajectory of an aircraft, the certification system being remote from the aircraft, the system comprising:
- at least one processor configured to:
  - receive the planned trajectory,
  - certify a specific trajectory according to at least one certification rule specific to a respective processing module; of a plurality of processing modules of the at least one processor,
  - select one or more of the processing modules as one or more active modules to certify the planned trajectory; based on one or more of equipment of the aircraft, a regulation by an airspace authority, and a mission of the aircraft, and
  - send a signal comprising a piece of certification information relating to the certification of the planned trajectory by all of the one or more active modules to the remote aircraft.

2. The certification system according to claim 1, wherein the one or more active modules is selected based on a user's choices made from a remote terminal.

3. The certification system according to claim 1, wherein each processing module is configured to use external data relating to an external environment of the aircraft, from a certified database.

4. The certification system according to claim 1, further comprising a processing modification device, configured to add or remove at least one processing module independently of an operation of the other processing modules.

5. The certification system according to claim 1, wherein each of the at least one certification rules is independent of each other.

6. The certification system according to claim 1, wherein the planned trajectory comprises a take-off point, a landing point, and a flight portion of the planned trajectory connecting the take-off point and the landing point.

7. The certification system according to claim 1, wherein each processing module is configured to certify the planned trajectory according to at least one piece of data relating to an element of the list consisting of:
- terrain;
- obstacles;
- areas of turbulence;
- time-restricted areas;
- reception coverage for satellite navigation system signals;
- mobile telephone or satellite telephone communications coverage; and
- trajectories of other aircraft.

8. The certification system according to claim 1, wherein each specific certification rule comprises determining the absence of conflicts between data for the planned trajectory and at least one condition selected from the list consisting of:
- the planned trajectory has a minimum margin to obstacles, the minimum margin at least depending on the wind around the planned trajectory at the time of flight of the planned trajectory;
- the planned trajectory is confined within a cage, with no position within the cage overlapping with an obstacle or a prohibited area;
- the planned trajectory being continuous, the continuity of the planned trajectory depending on a calculation of the energy required to fly the planned trajectory completely;
- the planned trajectory has a minimum distance to the terrain;
- the planned trajectory has a minimum distance to obstacles and/or time-restricted areas;
- the planned trajectory lies within a defined corridor around a predefined flight trajectory;
- the planned trajectory has an altitude above a minimum threshold above the terrain;
- the planned trajectory has a minimum reception coverage for satellite navigation system signals;
- the planned trajectory has a minimum mobile phone or satellite phone communications; and the planned trajectory has a minimum distance to other trajectories.

9. The certification system according to claim 1, wherein the piece of certification information comprises a piece of safety data determined by a cyclic redundancy check of the certified trajectory.

10. The certification system of claim 1, wherein each said processing module is configured to certify the given trajectory according to DO-178C avionics software certification standards.

11. The certification system of claim 10, wherein the certifying of the planned trajectory is based on equipment on board the aircraft and airspace authority regulations.

12. The certification system of claim 11, wherein the sending of the signal comprising the piece of certification information relating to the certification of the planned trajectory is performed over an encrypted communication link to enable autonomous aircraft operation.

13. The certification system of claim 12, wherein the piece of certification information comprises a piece of safety data determined by a cyclic redundancy check of the certified trajectory.

14. A method for certifying a planned trajectory of an aircraft, implemented by a certification system remote from the aircraft, the certification system including a receiving device configured to receive the planned trajectory, at least one processor comprising a plurality of processing modules, each processing module of the plurality of processing modules being configured to certify a specific trajectory according to at least one certification rule specific to a respective processing module of the plurality of processing modules, a selection device configured to select one or more of the processing modules as one or more active modules to certify the planned trajectory, and a sending device configured to send a signal comprising a piece of certification information relating to the certification of the planned trajectory by all of the one or more active modules, the certification method comprising:

receiving the planned trajectory;

selecting the one or more active modules used to certify the planned trajectory based on one or more of equipment of the aircraft, a regulation by an airspace authority, and a mission of the aircraft; and sending the signal comprising the piece of certification information relating to the certification of the planned trajectory by all of the one or more active modules to the remote aircraft.

15. The certification method according to claim 14, wherein the piece of certification information comprises safety data determined by a cyclic redundancy check of the certified trajectory.

16. The method for certifying a planned trajectory of an aircraft of claim 14, wherein the certifying performed by the processing module is implemented according to DO-178C avionics software certification standards.

17. The method for certifying a planned trajectory of an aircraft of claim 16, wherein the planned trajectory comprises geographical coordinates, time information, and speed parameters for autonomous aircraft flight, the sending of the signal is performed over an encrypted communication link to enable autonomous aircraft operation.

* * * * *